Dec. 11, 1923.

C. W. HOUGH

MILES PER GALLON INSTRUMENT

Filed Oct. 15, 1921

1,477,490

Witnesses:—

Inventor
C. W. Hough,
By
Attorney

Patented Dec. 11, 1923.

1,477,490

UNITED STATES PATENT OFFICE.

CLINTON WALLACE HOUGH, OF BOONVILLE, NEW YORK.

MILES-PER-GALLON INSTRUMENT.

Application filed October 15, 1921. Serial No. 508,012.

*To all whom it may concern:*

Be it known that I, CLINTON W. HOUGH, citizen of the United States, residing at Boonville, in the county of Oneida and State of New York, have invented certain new and useful Improvements in Miles-per-Gallon Instruments, of which the following is a specification.

This invention relates to an improvement in a device for indicating the miles per gallon obtained from fuel consumed by an internal combustion engine operating a vehicle.

A primary object of the invention is to provide a device of the character above set forth for continuously indicating the rate of fuel consumption per mile as distinguished from intermittently or at intervals, thereby informing the observer at all times of the fuel consumption per mile obtaining under all conditions of speed and load.

A further and more specific object of the invention is to provide an instrument of the type referred to which may be constructed so as to embody the well known mechanical principle of a revolving cylindrical magnet driven from an odometer shaft and operating in connection with a dial having suitable calibrations for giving the desired indication. In that connection the present device proposes to provide a rotatable dial calibrated in miles per gallon and which will be instantly responsive to changing operating conditions.

With the above and other objects in view which will be more readily apparent as the nature of the invention is better understood the same consists in the novel construction and arrangement of parts hereinafter more fully described, illustrated and claimed, and shown in the accompanying drawings, in which—

Similar reference characters designate corresponding parts throughout the several figures of the drawings.

Figure 1:
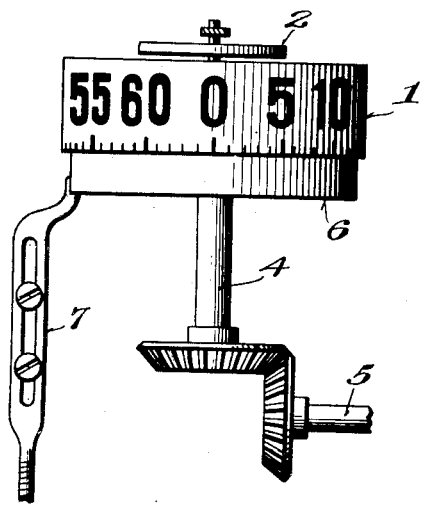
Figure 1 is a detail elevation of the present improvement showing the scale calibrated in miles per gallon.
Figure 2:
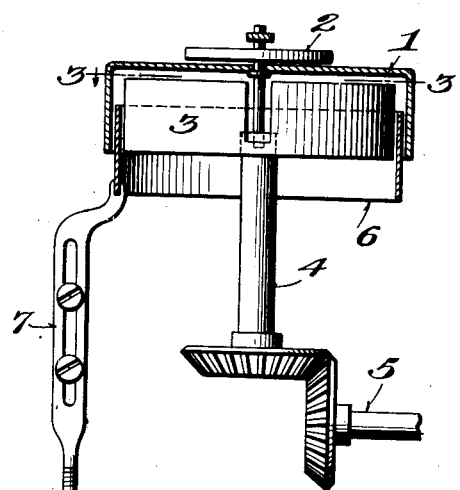
Figure 2 is a vertical sectional view thereof.
Figure 3:
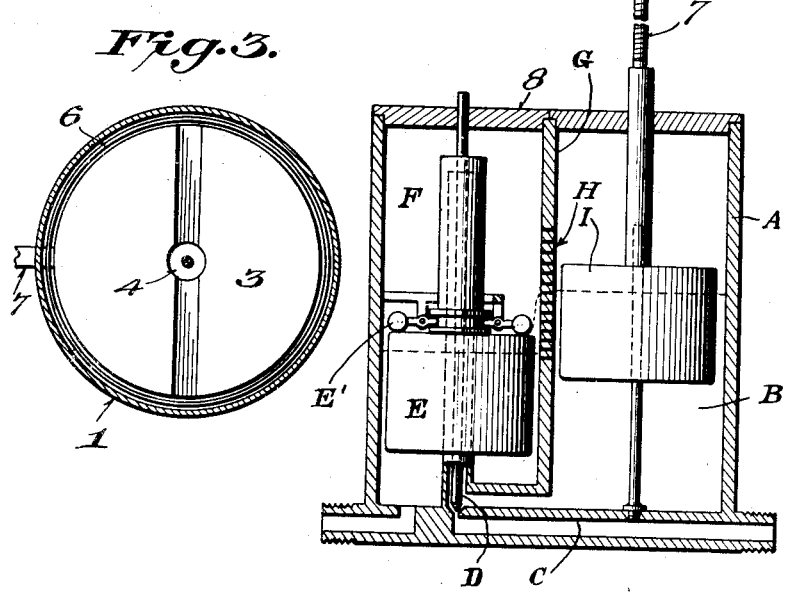
Figure 3 is a horizontal section on the line 3—3 of Figure 2.

In embodying the present invention in a commercial type of instrument, any suitable and convenient type of casing or housing may be used in which to mount the indicating dial 1 and the instrumentalities associated therewith for effecting the desired indications.

The dial 1 above referred to may be in the form of an aluminum cup tensioned by the spring 2 and having the outer face thereof calibrated in miles per gallon and mounted upon a post or the like so as to freely shift under the influence of a rotating magnet 3 which may be driven through the connections 4 and 5 by the usual odometer connections with the drive wheel of the vehicle. When the magnet 3 is rotated the lines of force therefrom act on the sides of the aluminum cup 1 and advance the same in proportion to the speed of the magnet.

According to the present invention it is proposed to coordinate with the instrumentalities above described a member operated by a flow meter thereby imposing upon the operation of the speed actuated elements, a fluid actuated member for producing the desired reading in miles per gallon. That is to say, in carrying out the improvement herein contemplated, a relatively thin iron shield or collar 6 is inserted to a greater or less extent in the air gap between the magnet 3 and the sides of the aluminum cup 1 thereby to divert the magnetic lines of force radiating from the magnet to the aluminum cup. For the purpose of shifting the iron shield between the magnet and the cup the same may be connected, as by a Bowden wire or the like 7, with a variable level float device 8 associated with the fuel system of the car.

Obviously, any suitable and convenient type of flow meter may be used, but by way of illustration the form shown in the drawing, and fully shown and described in my co-pending application Serial No. 508,013 filed October 15, 1921, may be employed.

The flow meter above referred to may include a casing A having a fuel receiving chamber B communicating with a source of fuel supply through the intake passage C, the said passage being controlled by the valve D actuated by the float E operating within the delivery chamber F of the casing. The receiving chamber B and the delivery chamber F are separated by a wall G having a plurality of perforations H which constitute a weir opening for permitting more or less liquid fluid to flow from the receiving chamber B to the delivery chamber F according to the level of fuel in the said receiving chamber. Within the receiving chamber B there is provided a float I which rises and falls with the level of fuel in the receiving chamber B and is connected with the Bowden wire 7. In this type of flow meter, as the motor uses more fuel the float E drops in the chamber F and through the medium of the weighted levers E' lifts the valve D to permit a greater quantity of fuel to flow to the receiving chamber B. On the other hand when the motor is using comparatively little fuel the float E rises and causes the valve D to move toward its seat, and due to the weir opening between the chambers B and F, the float I will rise and fall in proportion to the level of fuel in the said chamber B and in that way control the movement of the Bowden wire 7.

As the variable level float rises the connection 7 will cause the iron shield 6 to be inserted further into the air gap between the magnet 3 and the sides of the cup 1, consequently reducing the magnetic effect on the aluminum cylinder. It will be apparent that a full insertion of the iron shield will result in diverting all of the lines of force and result in zero rating on the instrument. On the other hand as the shield is withdrawn the magnetic effect gradually increases until it reaches its maximum when the shield is entirely removed. When the vehicle is standing still the magnet is stationary and the aluminum cylinder having the miles per gallon calibration thereon will remain in its zero position.

From the foregoing it will be apparent that the present invention proposes to provide a member controlled by a flow meter for diverting the lines of magnetic force between a rotating magnet and a properly calibrated indicating dial thereby producing the practical result of dividing miles by gallons which gives the result of continuously indicating the miles per gallon consumed.

Without further description it is thought that the many features and advantages of the invention will be readily apparent to those skilled in the art and it will of course be understood that changes in the form, proportion, and minor details of construction may be resorted to without departing from the spirit of the invention or the scope of the appended claims.

I claim:—

1. In a miles per gallon indicating instrument for motor driven vehicles, the combination with the fuel line, of a magnetically actuated indicator member adapted to be controlled by the movement of the vehicle, and means actuated in proportion to the rate of fuel consumption by the motor for controlling the operation of said magnetically actuated indicator member.

2. A miles per gallon indicating instrument for motor driven vehicles including an indicator member calibrated in miles per gallon, a rotating magnet for operating said member, and a shield adapted to be interposed between the magnet and the indicator for diverting the lines of magnetic force between the magnet and the indicator, and a flow meter for controlling the movement of said shield.

3. A miles per gallon indicating instrument for motor driven vehicles including an indicator member calibrated in miles per gallon, a rotatable magnet driven by the movement of the vehicle and spaced from the indicator to provide an air gap and means shiftable in said air gap and controlled by the rate of fuel consumption of the motor.

4. A miles per gallon indicating instrument for motor driven vehicles including an indicator member calibrated in miles per gallon, a rotatable magnet driven by the movement of the vehicle and spaced from the indicator to provide an air gap and an iron shield shiftable in said air gap and controlled by the rate of fuel consumption of the motor.

5. A miles per gallon indicating instrument for motor driven vehicles including an indicator member calibrated in miles per gallon, a rotatable magnet driven by the movement of the vehicle and spaced from the indicator to provide an air gap, a shield shiftably mounted in the air gap, and a flow meter in the fuel line to the motor and including a variable level float operatively connected to said shield.

In testimony whereof I hereunto affix my signature in the presence of two witnesses.

CLINTON WALLACE HOUGH.

Witnesses:
  EMORY L. GROFF,
  VIRGINIA L. WATSON.